United States Patent [19]

Hines

[11] 4,279,492

[45] Jul. 21, 1981

[54] PLANAR BELLOWS

[75] Inventor: Stephen P. Hines, Rochester, N.Y.

[73] Assignee: Eastman Kodak Company, Rochester, N.Y.

[21] Appl. No.: 161,707

[22] Filed: Jun. 23, 1980

[51] Int. Cl.³ .............................................. G03B 17/04
[52] U.S. Cl. ................................................... 354/187
[58] Field of Search .............................. 354/187–194, 354/219–225, 288

[56] References Cited

U.S. PATENT DOCUMENTS 3,836,933   9/1974   Hochreiter .......................... 354/187

*Primary Examiner*—John Gonzales
*Attorney, Agent, or Firm*—Thomas H. Close

[57] ABSTRACT

An improved bellows for use with a folding camera comprises a sheet of opaque resilient material, extending over an opening in the camera body. When the camera is folded, the bellows material is collapsed to a substantially flat plane, and when the camera is unfolded, the bellows material is expanded to define a light-tight, tent-like extension from the back of the camera.

In a preferred embodiment of the invention, the bellows material possesses a dimpled, or wrinkled microstructure such that the material is expandable in any direction by unfolding the microstructure.

3 Claims, 10 Drawing Figures

PLANAR BELLOWS

BACKGROUND OF THE INVENTION

Field of the Invention

The present invention relates to bellows and more particularly to bellows for use with a folding camera.

DESCRIPTION RELATED TO THE PROBLEM

U.S. Pat. No. 3,836,933 issued Sept. 17, 1974 to Hochreiter, discloses a photographic camera having a relatively long focal length lens and employing two mirrors in the optical path between the lens and the film plane of the camera. The two mirrors form a tent-like extension from the back of the camera and allow the overall dimensions of the camera to be substantially reduced. To further reduce the dimensions of the camera, when not in use, the mirrors are foldable into the body of the camera. A light-tight bellows enclosing the mirrors extends to define a tent-like configuration when the camera is in use. The bellows collapses along fold lines to lie nearly flat against the back of the camera when the mirrors are folded into the camera body.

Unfortunately, when the bellows are collapsed some edges and loose folds are exposed. The edges and loose folds do not provide an aesthetically pleasing appearance and are susceptible to damage by catching on camera cases, other camera equipment and the like. A further shortcoming of the bellows disclosed in the '933 patent is that such bellows must be manufactured by the rather costly process of laying up the bellows in pieces on a form and vulcanizing the pieces into a completed bellows or forming the bellows on a rather complex mold.

As noted in the '933 patent, it would be desirable to reduce the size of the mirror enclosure by making it conform to the camera's optical path, which somewhat resembles a truncated pyramid. However, when this is attempted, the folding pattern required to collapse the bellows becomes quite complex and even more edges and loose folds are exposed when the bellows are collapsed. Furthermore, as the complexity of the bellows increases, the complexity of manufacture is likewise increased in proportion.

The problem faced by the inventor, therefore, was to provide a bellows for a folding camera of the type described above which closely conforms to the optical path of the camera, presents an esthetically pleasing appearance when folded, and is free from exposed edges and loose folds when collapsed.

SOLUTION—SUMMARY OF THE INVENTION

The above noted problems are solved according to the present invention by providing an improved bellows for use in a camera of the type having a housing, an opening in the housing and optics supporting structure collapsable to reside substantially in said housing, and erectable to protrude substantially through said opening in said housing, the improved bellows comprising a sheet of resilient opaque material which: (1) extends over the opening and is fastened around the periphery thereof to the housing, (2) contracts to a substantially flat plane when the optics supporting structure is collapsed, and (3) extends within its elastic limit to define a tent-like enclosure when the optics supporting structure is erected.

In a preferred embodiment of the invention, the resilient material possesses a microstructure of wrinkles or dimples such that the material is expandable in all directions by unfolding the microstructure.

BRIEF DESCRIPTION OF THE DRAWING

The invention will be described with reference to the accompanying drawings, wherein.

DESCRIPTION OF THE PREFERRED EMBODIMENTS

Since photographic cameras are well known, the following description will be directed primarily to elements forming part of or cooperating directly with the present invention. It is to be understood that elements not specifically shown or described herein are to be selected from those known in the art.

Figure 1:
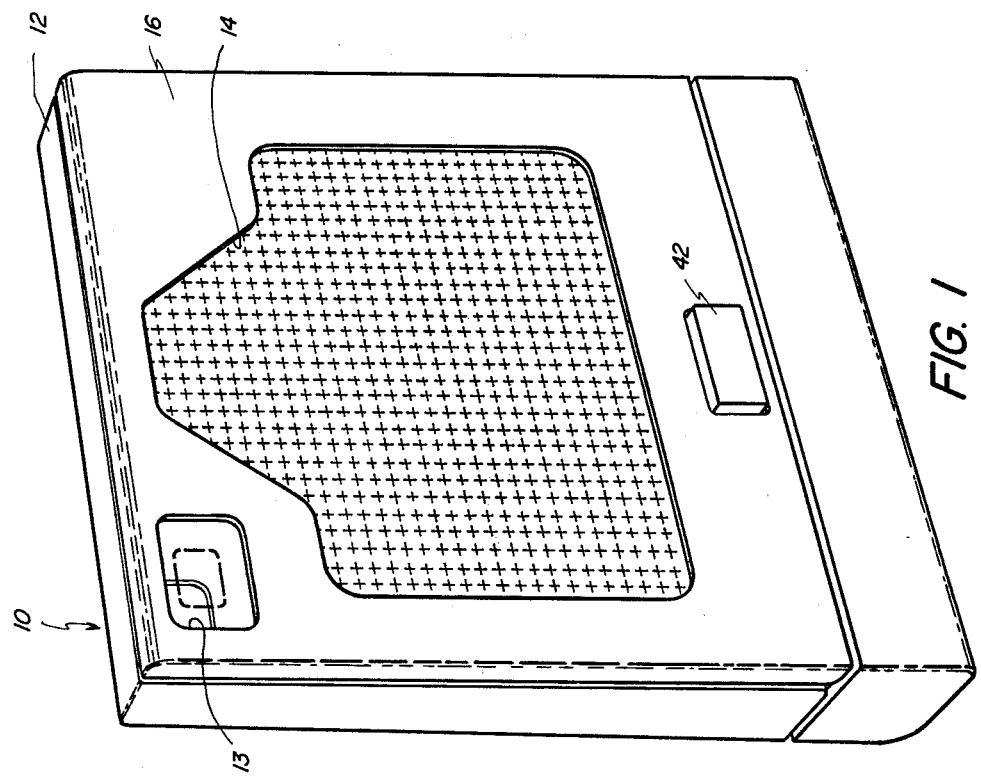
FIG. 1 is a perspective view of the back of a folding camera having a planar bellows according to the present invention, showing the bellows in a contracted configuration.
Figure 3:
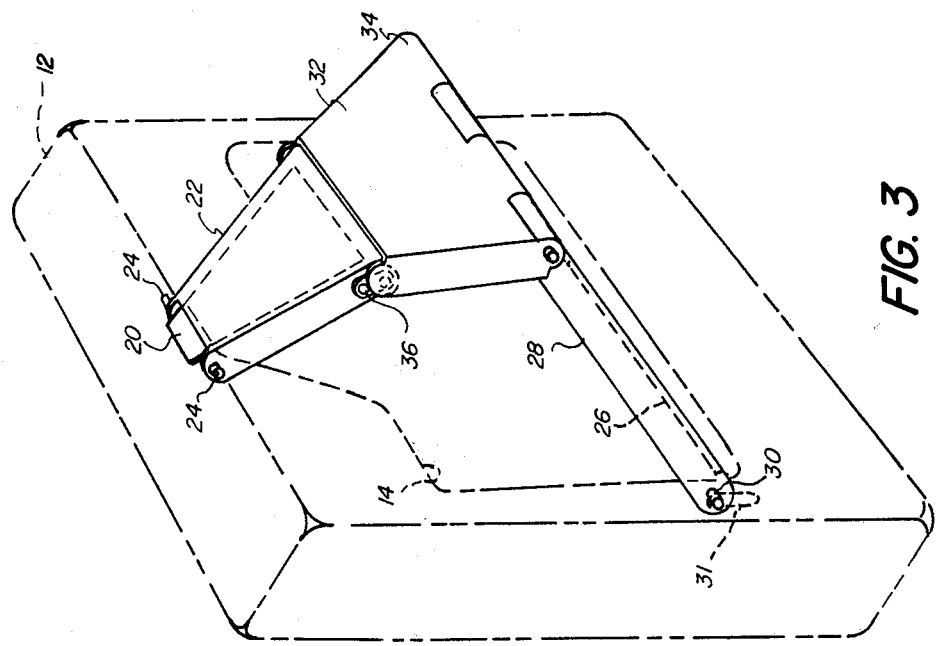
FIG. 3 is a perspective view of the mirror supporting structure of FIG. 2, unfolded and protruding through the hole in the back of the camera body.
Figure 2:
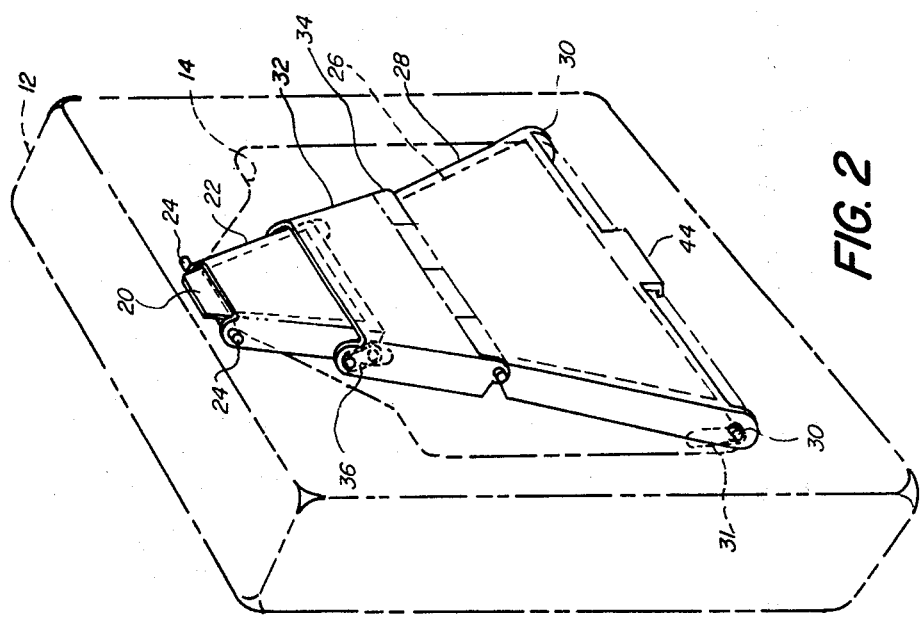
FIG. 2 is a perspective view of exemplary mirror supporting structure useable with the present invention, the structure is folded inside the camera body, which is shown in phantom.

FIG. 1 shows the back of a folding camera having a planar bellows in accordance with the present invention. The camera, generally designated 10, includes a camera body 12 which houses and provides support for film and optical components of the camera. A taking lens, not shown, is located on the front of the camera body near the top, and a viewfinder 13 is disposed adjacent the taking lens. An opening 14 in the back wall 16 of the camera body is covered by an opaque resilient membrane 18. In FIG. 1, the camera is shown in its folded configuration and the membrane 18 defines a substantially flat plane coextensive with the back of the camera. A collapsible mirror supporting structure located inside the camera body 12 is shown in FIG. 2. The camera body 12 is outlined in phantom. The mirror supporting structure is designed to define, when unfolded, the outer limits of the optical path of the camera. A first trapezoidally shaped mirror 20 is supported by a generally U-shaped bracket 22 which is pivotally coupled to the camera body by pins 24. A second, generally larger, trapezoidally shaped mirror 26 is supported by a generally U-shaped bracket 28 which is pivotally and slidably coupled to the camera body by pins 30 in slots 31 provided in camera body 12. a generally U-shaped connecting bracket 32 is coupled by a hinge 34 to mirror support bracket 28 and is coupled to mirror support bracket 22 by means of links 36. When collapsed, as shown in FIG. 2, the mirror supporting structure is contained entirely within the camera body and does not protrude through opening 14. As shown in FIG. 3, when the mirror supporting structure is erected, as required for taking a picture, a substantial portion thereof extends through opening 14.

Figure 6:
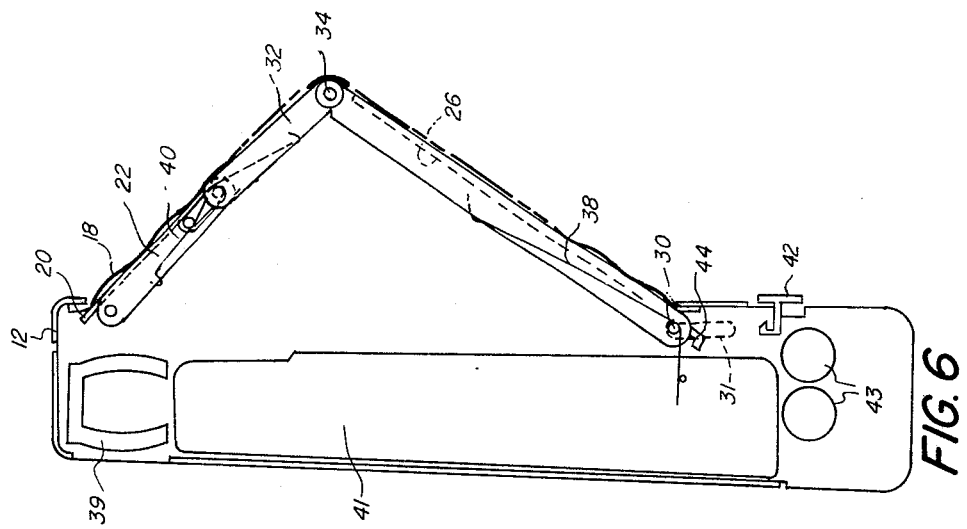
FIGS. 4–6 are side views of the camera shown in FIG. 1, broken away to reveal the interior of the camera, a cross section of a bellows according to the present invention, and showing the mirror supporting structure: folded; midway between folded and unfolded; and unfolded, respectively.
Figure 5:
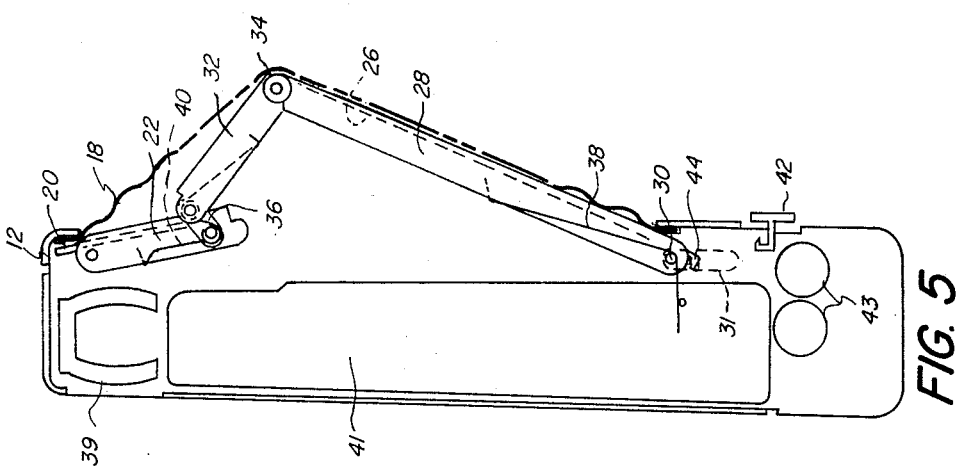
Figure 4:
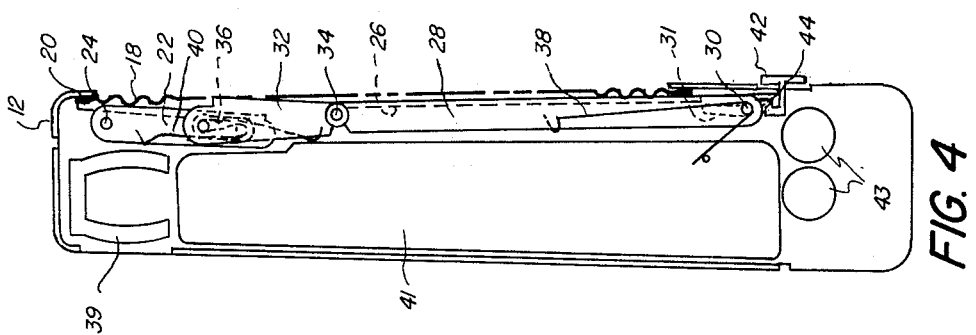

FIGS. 4–6 illustrate sequential stages in the erection of the mirror supporting structure.

As shown in FIG. 4, mirror support bracket 28 is urged outward and in a generally clockwise direction by spring 38. Link 36 is urged in a generally clockwise direction by spring 40. The effects of springs 38 and 40 are to urge the mirror supporting structure from a collapsed configuration, shown in FIG. 4 to an erected configuration, as shown in FIG. 6. Also shown inside the camera body 12 in FIGS. 4–6 are a lens 39, a film cartridge 41 and a pair of processing rollers 43 for processing film units of the self developing type.

The mirror supporting structure is releasably held in its folded configuration by a latch 42 in cooperation with an extension 44 on mirror support bracket 28. Extension 44 is so configured as to be engaged by latch 42 when the support structure is fully collapsed as described below. With latch 42 engaging extension 44, the mirror supporting structure is releasably held in the folded configuration shown in FIG. 4. To release the supporting structure from the folded configuration, the user depresses latch 42 to release the latch and springs 38 and 40 urge the structure to its erected configuration.

Figure 7:
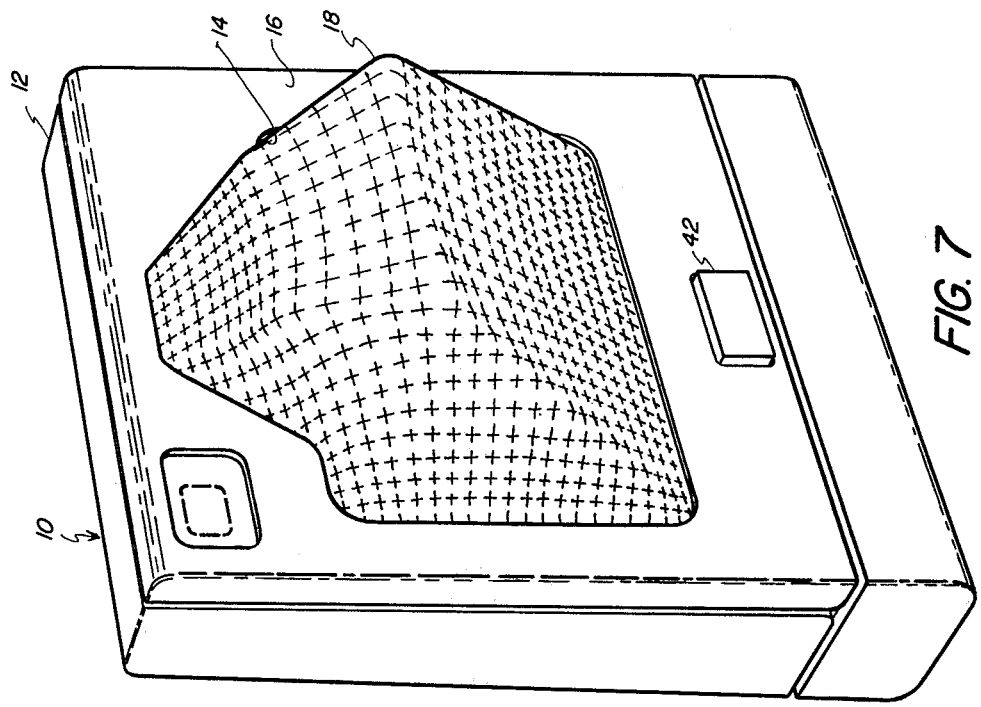
FIG. 7 is a perspective view similar to FIG. 1 showing the bellows in a fully expanded configuration.

FIG. 5 shows the mirror supporting structure midway between the collapsed and the erected configuration. FIG. 6 shows the supporting structure fully erected. When the supporting structure is in its erected configuration, the mirrors 20 and 26 are disposed in the proper positions for operating the camera. As noted above, in this configuration, a substantial portion of the mirror supporting structure extends through opening 14 in the back of the camera. As the mirror supporting structure was extended through the opening 14 during erection, the planar membrane 18 was expanded to provide a light-tight tent-like protrusion from the back of the camera enclosing the optical path of the camera. With the supporting structure fully erected as shown in FIG. 6, the back of the camera appears as shown in perspective in FIG. 7. The planar bellows 18 snugly conforms to the outlines of the underlying mirror supporting structure. To collapse the mirror supporting structure, the user depresses (through the bellows) mirror supporting bracket 22 to pivot the bracket around pins 24 placing the structure in the configuration shown in FIG. 5. The user then depresses the hinge area 34 (through the bellows) to completely collapse the structure and engage latch 42.

In a preferred embodiment of the invention, the bellows material comprises an elastic membrane having a wrinkled or dimpled microstructure to allow the material to expand in any direction by unfolding the wrinkles or dimples rather than by substantially stretching the membrane.

Figure 8:
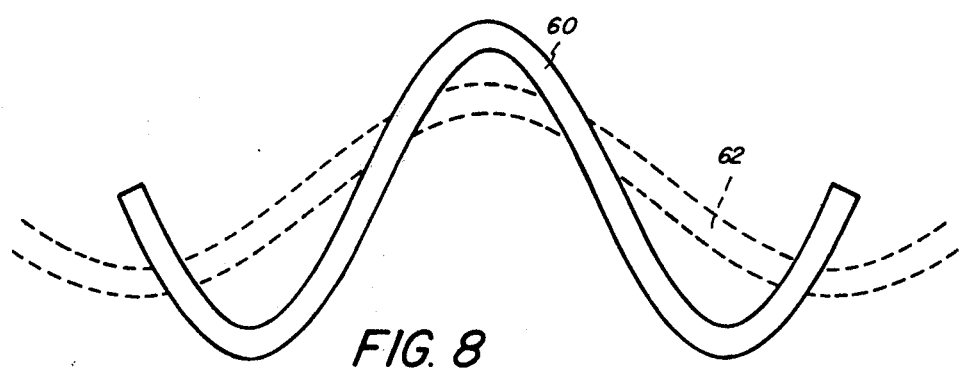
FIG. 8 is a schematic illustration of a cross section of bellows material and the mod of expansion of the bellows material according to a preferred embodiment of the present invention.

FIG. 8 schematically illustrates the principle showing a cross section of the relaxed microstructure 60 and the corresponding expanded or unfolded cross ection 62. In this example, the microstructure is shown as comprising sinusoidal hills and valleys in the surface of the material. When tension is applied to the membrane, the microstructure "unfolds" to allow the material to expand without substantially stretching the material. So that the bellows material may expand in all directions, the microstructure must be such that any cross section through the material will exhibit these hills and valleys. If there were any cross section that resulted in a straight line, the expansion of the membrane would be limited in that direction. An example of a regularly dimpled pattern with the desired property is demonstrated by the apparatus shown in FIG. 9. A form, comprising bottom rails 70 and 72 connected by a cross member 73 and having sinusoidal patterns in their top surfaces, and side rails 74 and 76 supported in relation to the bottom rails and having sinusoidal patterns on their inside edges, is arranged to hold a stack of lamelae 78 (of which only three are shown) having sinusoidal top edges 80. The sinusoids all have the same frequency, and the bottom and side rails are disposed so that their sinusoids are $\frac{1}{4}$ period out of phase. The resulting surface defined by the top edges of the lamelae has the property that any cross section through the surface will exhibit a wavy sinusoidal pattern similar to that shown in FIG. 8.

Figure 9:
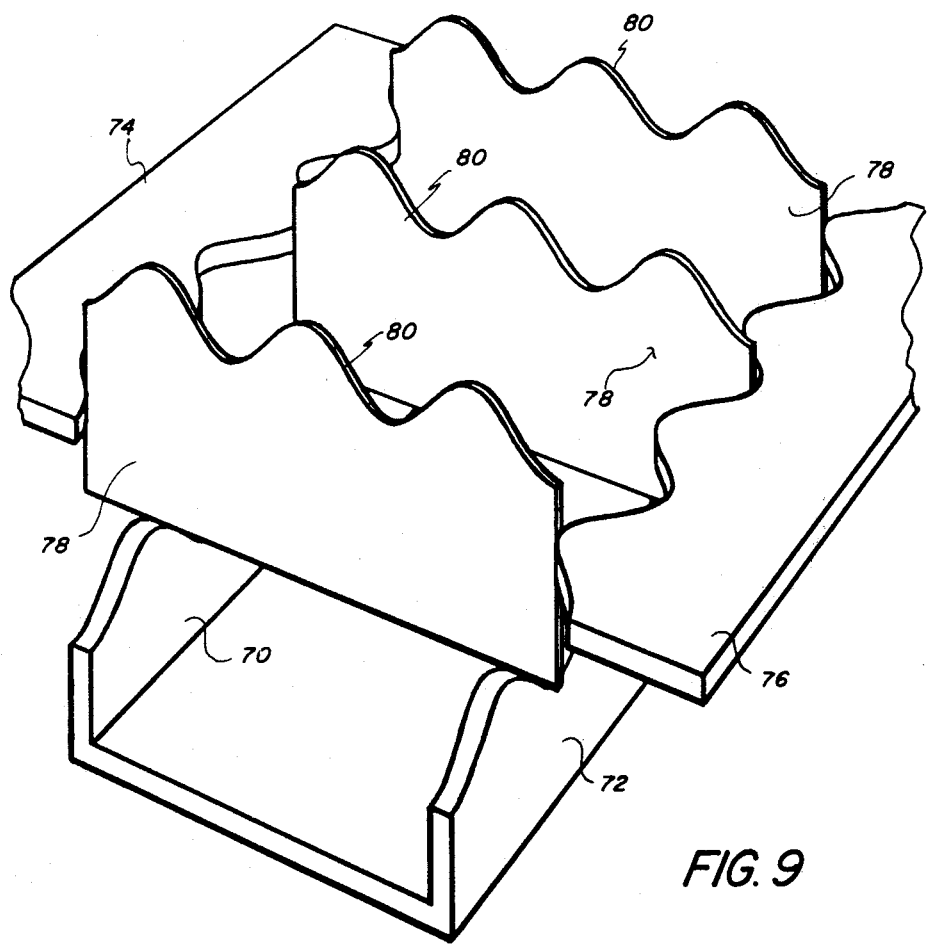
FIG. 9 is a perspective view of apparatus employed to demonstrate a microstructure having the property of being stretchable in any direction by unfolding the microstructure.
Figure 10:
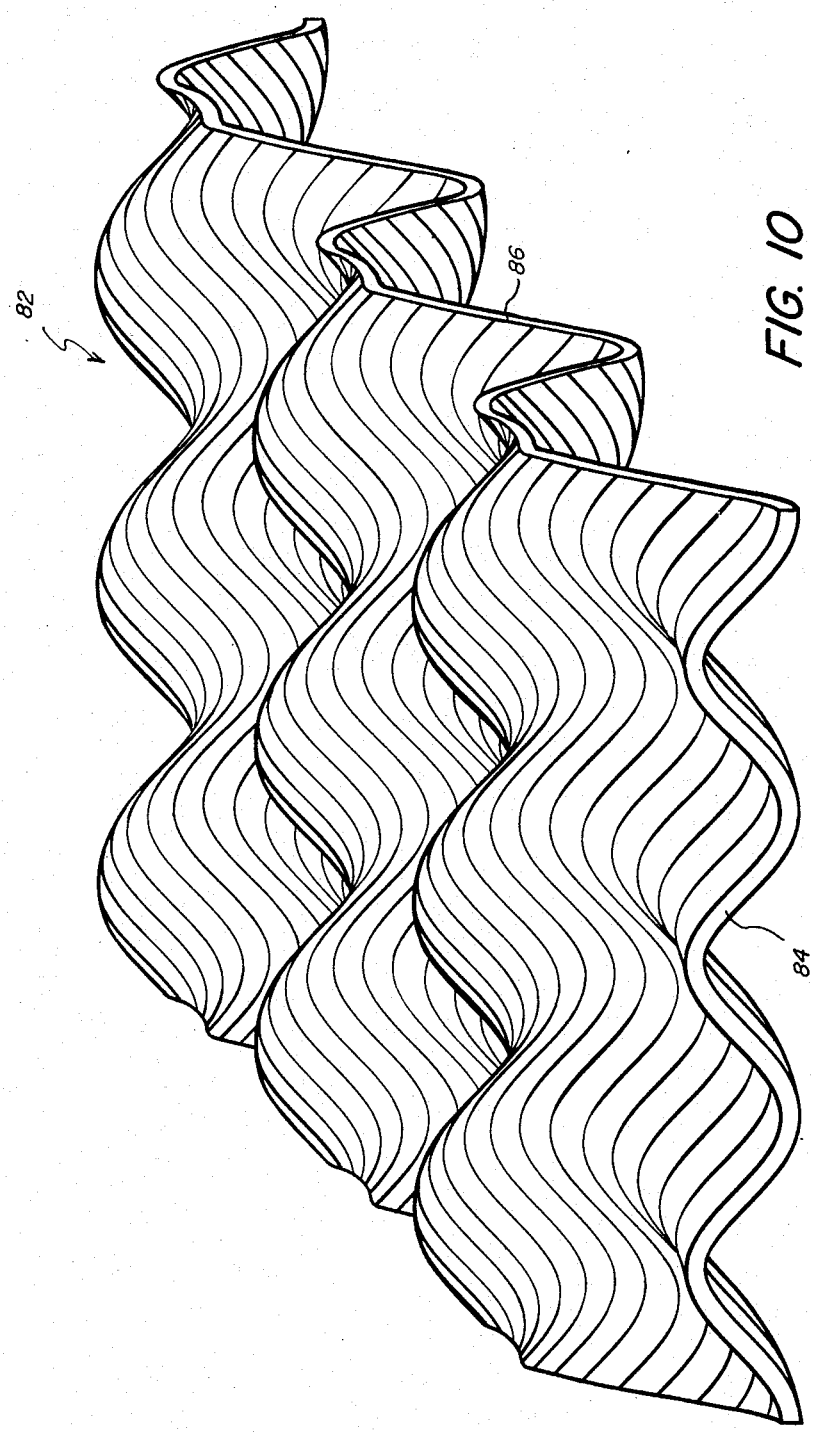
FIG. 10 is a perspective view of a portion of a membrane having the microstructure demonstrated by the apparatus of FIG. 9.

Some cross sections will not be simple sinusoids, but will include some kinks in the waveforms. An example of a portion of a membrane having the type of surface defined by the apparatus in FIG. 9 is shown in FIG. 10. The membrane 82 exhibits a pure sinusoid along one edge 84 and a complex sinusoid along edge 86. An example of a microstructure having random wrinkles that exhibits the desired property of expanding in all directions by unfolding wrinkles, is the type of pattern produced when a sheet of paper is crumpled and wadded into a ball, then is straightened out. The random wrinkled pattern remaining in the paper provides a model for another type of microstructure useful in the bellows material.

A membrane having the desired microstructure may be made, for example, by coating a sheet of elastomeric material on a surface mold having the desired pattern, or by forming an uncured sheet of rubber material against such a mold and then curing the sheet in place. In this way, the bellows material can be made up in large sheets, or continuous rolls, and the individual bellows merely cut therefrom for assembly into a camera. This greatly reduces the cost of manufacturing the bellows.

The invention has been described with particular reference to preferred embodiments, it will be understood that variations and modifications can be effected within the spirit and scope of the invention.

I claim:

1. In a camera of the type having a housing with an opening, means for supporting camera optics for movement between a position substantially within said housing and a position protruding substantially through said opening in said housing, and a bellows covering said opening and defining a light-tight closure for said camera, an improved bellows comprising:

a flat sheet of resilient, opaque material extending over said opening and fastened around its periphery to said housing, said sheet being extendable within its elastic limit to define a tent-like configuration when said supporting structure is in said protruding position and contractible by its own restoring forces to a substantially flat plane when said optics supporting structure is collapsed.

2. The invention claimed in claim 1, wherein said resilient material possesses a microstructure of wrinkles or dimples such that said material is expandable in any direction by unfolding said microstructure.

3. The invention claimed in claim 2, wherein said microstructure is a regular array of dimples formed such that any cross section of the material exhibits a sinusoidal pattern.

* * * * *